(12) United States Patent
Tanaka et al.

(10) Patent No.: US 9,454,069 B2
(45) Date of Patent: *Sep. 27, 2016

(54) ILLUMINATION SYSTEM HAVING FIRST AND SECOND LENS ARRAYS INCLUDING PLANO-CONVEX LENSES WHEREIN SOME LENSES IN THE SECOND ARRAY INCLUDE A FIRST AND A SECOND LENS ELEMENT, PROJECTION-TYPE DISPLAY APPARATUS, AND OPTICAL INTEGRATOR

(71) Applicant: Seiko Epson Corporation, Tokyo (JP)

(72) Inventors: Katsumi Tanaka, Matsumoto (JP); Osamu Fujimaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 14/571,188

(22) Filed: Dec. 15, 2014

(65) Prior Publication Data

US 2015/0098063 A1    Apr. 9, 2015

Related U.S. Application Data

(63) Continuation of application No. 12/491,297, filed on Jun. 25, 2009, now Pat. No. 9,104,094.

(30) Foreign Application Priority Data

Jul. 8, 2008   (JP) .................. 2008-177908
May 20, 2009  (JP) .................. 2009-121675

(51) Int. Cl.
  *G03B 21/14*  (2006.01)
  *F21S 8/00*   (2006.01)
  (Continued)

(52) U.S. Cl.
  CPC ............. *G03B 21/208* (2013.01); *F21V 5/004* (2013.01); *F21V 13/04* (2013.01); *G02B 3/0062* (2013.01);
  (Continued)

(58) Field of Classification Search
  CPC  G03B 21/208; G03B 21/2013; G03B 21/20; F21V 5/004; F21V 5/04; H04N 9/3152; H04N 9/315; H04N 13/0228; G02B 3/0068; G02B 3/0062; G02B 3/005; G02B 3/0006
  USPC .......... 353/30, 34, 32, 122, 38, 94; 362/538, 362/235, 268, 326, 331, 338, 458, 553, 362/554; 359/419, 454, 448, 741, 796, 798, 359/799, 896, 639, 621
  See application file for complete search history.

(56) References Cited

U.S. PATENT DOCUMENTS 5,997,143 A   12/1999  Derra et al.
6,109,752 A   8/2000   Itoh et al.
(Continued)

FOREIGN PATENT DOCUMENTS

JP   2000-003612 A   1/2000
JP   2000-3612 A     1/2000
(Continued)

OTHER PUBLICATIONS

Non-Final Office Action received in U.S. Appl. No. 12/491,297; Dec. 8, 2011.
(Continued)

*Primary Examiner* — Tony Ko
*Assistant Examiner* — Jennifer Bennett
(74) *Attorney, Agent, or Firm* — ALG Intellectual Property, LLC

(57) ABSTRACT

In at least one embodiment of the disclosure, an illumination system includes a light source that emits an illumination light flux. A first lens array has a plurality of first small lenses arranged therein. The first small lenses divide the illumination light flux emitted from the light source into a plurality of segmental light fluxes. A second lens array has a plurality of second small lenses arranged therein. The second small lenses have a one-to-one correspondence with the first small lenses and are configured to receive the segmental light fluxes exiting from the first small lenses. At least some of the second small lenses each include a plurality of lens elements disposed in a surface direction that is the same as the second small lenses. A superimposing lens superimposes on an illuminated area the segmental light fluxes exiting from the plurality of second small lenses.

19 Claims, 8 Drawing Sheets

(51) Int. Cl.
- *G02B 27/10* (2006.01)
- *G03B 21/20* (2006.01)
- *H04N 9/31* (2006.01)
- *G02B 3/00* (2006.01)
- *F21V 5/00* (2015.01)
- *F21V 13/04* (2006.01)

(52) U.S. Cl.
CPC ......... *G02B 3/0068* (2013.01); *G03B 21/2013* (2013.01); *G03B 21/2066* (2013.01); *H04N 9/315* (2013.01); *H04N 9/3152* (2013.01)

(56) References Cited

U.S. PATENT DOCUMENTS

| | | | |
|---|---|---|---|
| 6,222,674 B1 | 4/2001 | Ohta | |
| 6,337,759 B1 | 1/2002 | Yamamoto | |
| 6,464,375 B1 | 10/2002 | Wada et al. | |
| 6,466,536 B1 | 10/2002 | Katsuma | |
| 7,125,144 B2 | 10/2006 | Shimaoka et al. | |
| 9,104,094 B2 * | 8/2015 | Tanaka et al. | G03B 21/2013 |
| 2008/0112056 A1 | 5/2008 | Raymond et al. | |

FOREIGN PATENT DOCUMENTS

| | | |
|---|---|---|
| JP | 2000-035553 A | 2/2000 |
| JP | 2000-180796 A | 6/2000 |
| JP | 2001-013462 A | 1/2001 |

OTHER PUBLICATIONS

Final Office Action received in U.S. Appl. No. 12/491,297; May 21, 2012.

Non-Final Office Action received in U.S. Appl. No. 12/491,297; Mar. 21, 2013.

Final Office Action received in U.S. Appl. No. 12/491,297; Aug. 30, 2013.

Non-Final Office Action received in U.S. Appl. No. 12/491,297; Dec. 24, 2013.

Final Office Action received in U.S. Appl. No. 12/491,297; Jun. 5, 2014.

Non-Final Office Action received in U.S. Appl. No. 12/491,297; Dec. 15, 2014.

* cited by examiner

ILLUMINATION SYSTEM HAVING FIRST AND SECOND LENS ARRAYS INCLUDING PLANO-CONVEX LENSES WHEREIN SOME LENSES IN THE SECOND ARRAY INCLUDE A FIRST AND A SECOND LENS ELEMENT, PROJECTION-TYPE DISPLAY APPARATUS, AND OPTICAL INTEGRATOR

CROSS-REFERENCE

The present application is a continuation of U.S. patent application Ser. No. 12/491,297 filed Jun. 25, 2009, which claims priority from Japanese Patent Application No. 2008-177908 filed on Jul. 8, 2008 and Japanese Patent Application No. 2009-121675 filed on May 20, 2009, each of which is hereby incorporated by reference in its entirety.

BACKGROUND

An optical integrator (hereinafter simply referred to as an "integrator") is known as an optical system that is used to uniformly illuminate an area. An integrator includes two lens arrays disposed in parallel, each of the lens arrays having a plurality of lenses (small lenses) densely arranged therein, which is known in the art as a fly's-eye lens. A non-uniform light flux incident on one of the lens arrays is divided into a plurality of segmental light fluxes, which are then superimposed and focused on the illuminated area.

It is known to employ an integrator-based illumination system in a projector, which is one type of projection-type display apparatus. On the other hand, there have been proposed projectors of this type including a plurality of illuminants in order to meet a need to increase the brightness of projected images (see, e.g., Japanese Patent Publication No. 2000-3612).

In the integrator described above, the images of the plurality of illuminants are formed on the light exiting-side second lens array. However, since the images of the plurality of illuminants are not on the optical axes of the small lenses arranged in the second lens array, the images produced when the segmental light fluxes exited from the integrator are superimposed and focused on the illuminated area may be blurred.

SUMMARY

Various embodiments described in the disclosure may, among other things, help prevent image blur that occurs when the segmental light fluxes having exited from the integrator are superimposed and focused on the illuminated area.

At least one embodiment is directed to an illumination system that illuminates an illuminated area, the illumination system including: a light source that emits an illumination light flux, a first lens array that is an optical component having a plurality of first small lenses arranged therein, the first small lenses dividing the illumination light flux emitted from the light source into a plurality of segmental light fluxes, a second lens array that is an optical component having a plurality of second small lenses arranged therein, the second small lenses corresponding to the respective plurality of first small lenses and receiving the incident segmental light fluxes having exited from the plurality of first small lenses, and a superimposing lens that superimposes the segmental light fluxes having exited from the plurality of second small lenses on the illuminated area, wherein each of at least part of the plurality of second small lenses arranged in the second lens array is formed of a plurality of lens elements disposed in the surface direction that is the same as the arrangement direction of the second small lenses.

According to this embodiment, each of at least part of the plurality of second small lenses arranged in the light exiting-side second lens array, which forms an integrator, is formed of a plurality of lens elements disposed in the surface direction that is the same as the arrangement direction of the second small lenses. Therefore, when each of the segmental light fluxes having exited from the first lens array is divided into a plurality of light fluxes, the divided light fluxes can be transferred through the lens elements. The segmental light fluxes having exited from the second lens array can therefore be more precisely superimposed and focused on the illuminated area. As a result, image blur may be reduced or prevented.

At least one embodiments is directed to the illumination system according to the previously described embodiment, wherein the illuminated area is a rectangle, and the direction in which the plurality of lens elements, which form each of the second small lenses, are disposed is the same as the direction of a side of the illuminated area.

According to this embodiment, the illuminated area can be more uniformly illuminated.

At least one embodiment is directed to the illumination system according to previously described embodiments, wherein the rectangle is an oblong, and the side of the illuminated area is the longer side of the oblong.

According to this embodiment, when the illuminated area is oblong, the illuminated area can be more uniformly illuminated.

At least one embodiment is directed to the illumination system according to any of the previously described embodiments, wherein the light source includes a plurality of illuminants, and the number of lens elements, which form each of the second small lenses, is the same as the number of the illuminants.

According to this embodiment, since the light source includes a plurality of illuminants, the amount of illumination light can be increased. Further, the segmental light fluxes having exited from the second lens array can be more precisely superimposed and focused on the illuminated area even when the plurality of illuminants are used. As a result, little or no image blur occurs.

At least one embodiment is directed to the illumination system according to the previously described embodiment, wherein the light source includes a plurality of concave mirrors the number of which is the same as the number of the plurality of illuminants, the concave mirrors paired the illuminants and collecting light emitted therefrom, a light reflector on which the light fluxes collected by the plurality of concave mirrors are incident, the light reflector reflecting the light fluxes in predetermined directions, and a collector lens on which the light fluxes reflected off the light reflector are incident, the collector lens converting the incident light into substantially parallelized light and outputting the substantially parallelized light.

According to this embodiment, the light source having a more simple configuration can convert the illumination light fluxes from the plurality of illuminants into substantially parallelized light and output it.

At least one embodiment is directed to the illumination system according to the previously described embodiment, wherein the direction in which the images of the plurality of illuminants formed on the light reflector are disposed coincides with the direction in which the plurality of lens elements, which form each of the second small lenses, are disposed.

According to this embodiment, the segmental light fluxes having exited from the second lens array can be more precisely superimposed and focused on the illuminated area even when the plurality of illuminants are used. As a result, little or no image blur occurs.

At least one embodiment is directed to a projection-type display apparatus including: the illumination system according to any of the above-described embodiments, a light valve that receives illumination from the illumination system and forms an optical image in accordance with an image signal, and a projection unit that projects the light having exited from the light valve.

This embodiment can help increase the brightness of a projected image and prevent image blur at the same time.

At least one embodiment is directed to an optical integrator including: a first lens array that is an optical component having a plurality of first small lenses arranged therein, the first small lenses dividing an incident illumination light flux into a plurality of segmental light fluxes, and a second lens array that is an optical component having a plurality of second small lenses arranged therein, the second small lenses corresponding to the respective plurality of first small lenses and receiving the incident segmental light fluxes having exited from the plurality of first small lenses, wherein each of at least part of the plurality of second small lenses arranged in the second lens array is formed of a plurality of lens elements disposed in the surface direction that is the same as the arrangement direction of the second small lenses.

According to this embodiment, the segmental light fluxes having exited from the second lens array can be precisely superimposed and focused on an illuminated area, as in the case of the illumination system according to the first application. As a result, no little or no image blur occurs.

The embodiments of the disclosure can be implemented in a variety of aspects. For example, the embodiments can be implemented in the form of a projector or a monitor apparatus.

BRIEF DESCRIPTION OF THE DRAWINGS

Non-limiting and non-exhaustive embodiments of the present disclosure will now be described with reference to the accompanying drawings, wherein like reference numbers reference like elements.

DESCRIPTION OF EMBODIMENTS

In the following description, reference is made to the accompanying drawings which form apart hereof, and in which are shown, by way of illustration, specific embodiments in which the disclosure may be practiced. It is to be understood that other embodiments may be utilized and structural or logical changes may be made without departing from the scope of the present disclosure. Therefore, the following description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" (or "one variation" or "a variation") means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments or variations will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

Embodiments of an illumination system, a projection-type display apparatus, and an integrator according to the disclosure will be described below based on specific, non-limiting examples.

Figure 1:
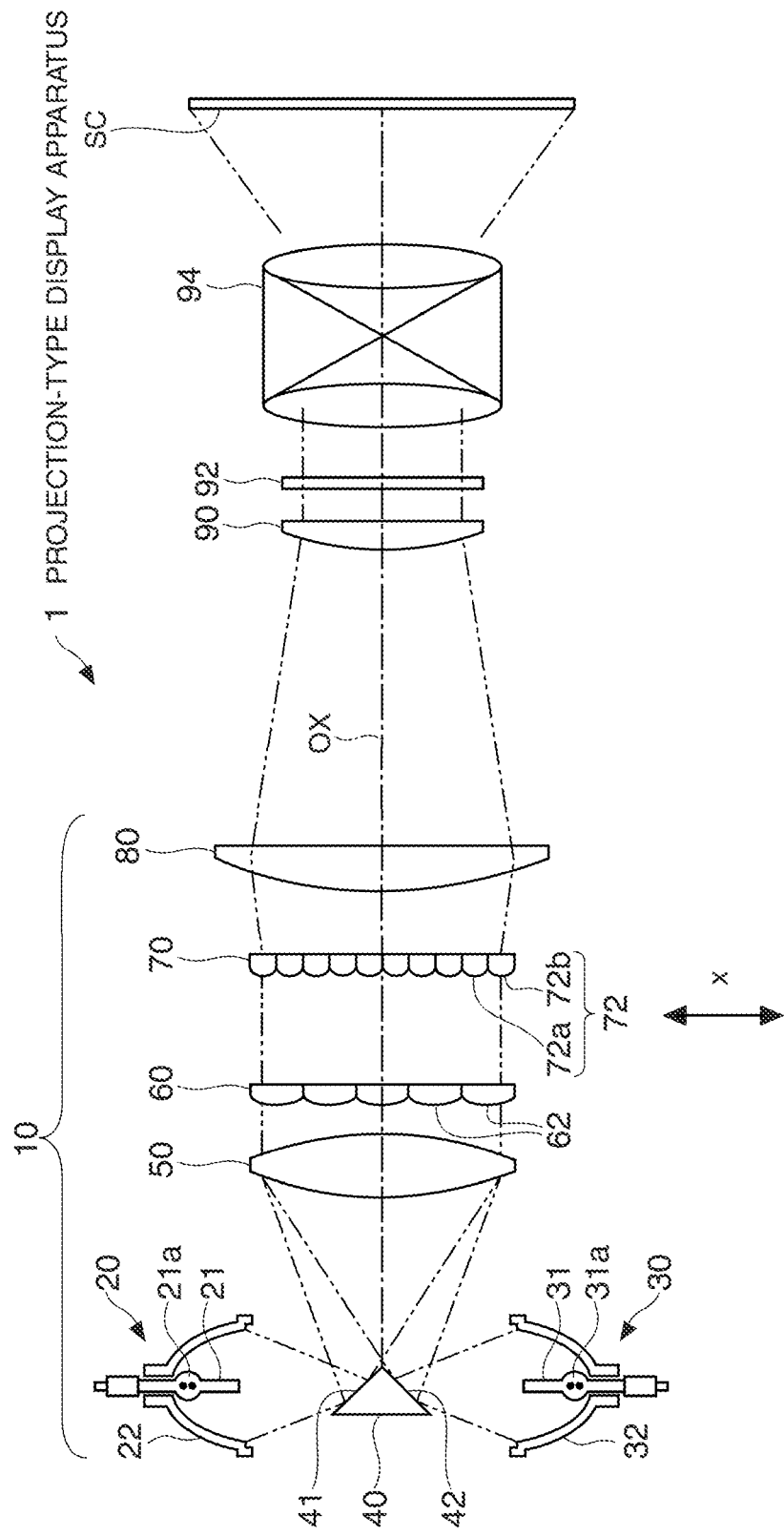
FIG. 1 is a descriptive diagram schematically illustrating an optical system of a projection-type display apparatus 1 in accordance with an embodiment.

FIG. 1 is a descriptive diagram schematically showing an optical system of a projection-type display apparatus 1 of at least one embodiment. The projection-type display apparatus 1 is what is called a projector. FIG. 1 is a top view. As shown in FIG. 1, the projection-type display apparatus 1 includes an illumination system 10, a field lens 90, a liquid crystal light valve 92, and a projection lens 94.

The illumination system 10 includes first and second discharge lamps 20, 30, a reflection prism 40, a collector lens (condenser lens) 50, first and second lens arrays 60, 70 that form an integrator, and a superimposing lens 80.

Each of the first and second discharge lamps 20, 30 can be a metal-halide lamp, an ultrahigh-pressure mercury lamp, a xenon lamp, or any other suitable lamp, and includes arc tubes 21, 31 and reflectors 22, 32. In the arc tubes 21 and 31, arc discharge forms illuminants 21a and 31a. The light fluxes emitted from the illuminants 21a and 31a are reflected off the respective reflectors 22 and 32 and exit through openings.

Figure 2:
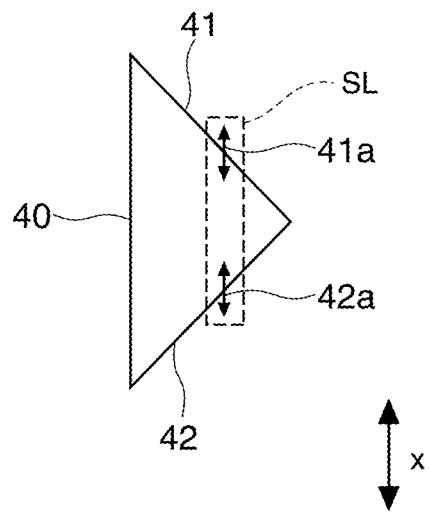
FIG. 2 is a descriptive diagram illustrating a secondary light source formed at a reflection prism.

The first and second discharge lamps 20, 30 are disposed in such a way that the light fluxes having exited therefrom face each other, and the reflection prism 40 is provided in the middle between the two discharge lamps. The reflectors 22 and 32 provided in the first and second discharge lamps 20, 30 are light-collecting ellipsoidal concave mirrors that have first focal points at the illuminants 21a and 31a and second focal points on reflection surfaces 41 and 42 of the reflection prism 40. A secondary light source SL formed of images 41a and 42a of the illuminants 21a and 31a can therefore be formed in the vicinity of the reflection surfaces 41 and 42 of the reflection prism 40, as shown in FIG. 2. As a result, the optical system described below can handle the light fluxes emitted from the illuminants 21a and 31a inherently spaced apart from each other as the light emitted from the secondary light source SL. Each of the reflection surfaces 41 and 42 of the reflection prism 40 has an aluminum film or a dielectric multilayer film deposited thereon and hence efficiently reflects visible light.

Figure 3:
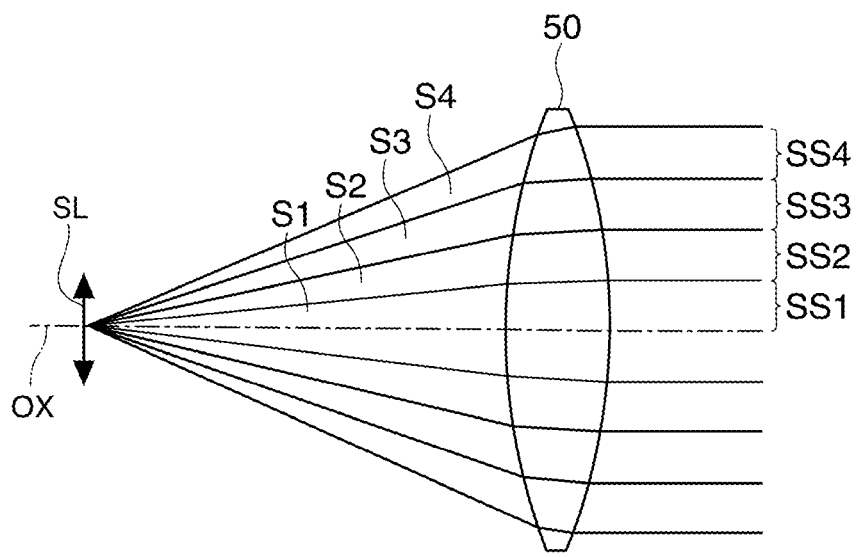
FIG. 3 is a descriptive diagram illustrating how a collector lens controls the direction in which an incident light flux travels.

The light emitted from the secondary light source SL formed at the reflection prism 40 is divergent light and incident on the collector lens 50. The collector lens 50 is, for example, an aspheric biconvex lens. FIG. 3 is a descriptive diagram showing how the collector lens 50 controls the direction in which the incident light flux travels.

The collector lens 50 converts the incident light into substantially parallelized light. FIG. 3 is a descriptive diagram conceptually showing how the collector lens 50 works. In FIG. 3, the cross section of the exiting light flux is divided into four areas for convenience. As shown in FIG. 3, let S1, S2, S3, and S4 be the light flux density in the four areas of the incident light flux, and let SS1, SS2, SS3, and SS4 be the light flux density in the four areas of the exiting light flux. The collector lens 50 controls the direction in which the incident light flux travels, for example, in such a way that the following conditions are satisfied: S1<SS1, S2<SS2, S3=SS3, S4>SS4, and SS1>SS2>SS3>SS4, and outputs the resultant light flux. In this way, the collector lens 50 outputs parallelized light flux whose density decreases with distance from the optical axis OX. It is noted that the parallelized light flux used herein is not a parallelized light flux in the exact sense but only needs to be a substantially parallelized light flux.

Referring back to FIG. 1, the parallelized light flux from the collector lens 50 is incident on the first lens array 60 having a plurality of small lenses arranged therein. The entire optical system upstream of the first lens array 60, that is, the first and second discharge lamps 20, 30, the reflection prism 40, and the collector lens 50 form a "light source," which is one of the components of the embodiment. The light source does not necessarily have the above configuration, but can have any other suitable configuration, for example, a configuration including a flat mirror between the first discharge lamp 20 and the reflection prism 40 and another flat mirror between the second discharge lamp 30 and the reflection prism 40 so that the first and second discharge lamps 20, 30 are differently disposed. Any configuration essentially works as long as an illumination light flux can be delivered to the integrator. In certain embodiments, however, a substantially parallelized illumination light flux is outputted as shown in the present example.

Figure 4:
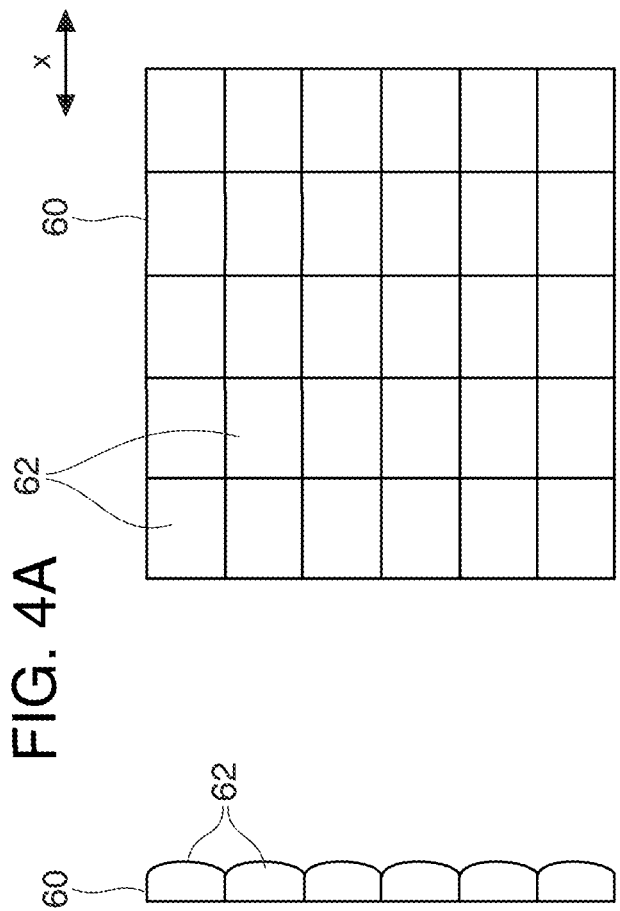
FIGS. 4A to 4C are descriptive diagrams illustrating a first lens array.

FIGS. 4A to 4C are descriptive diagrams showing the first lens array 60. FIG. 4A is a front view. FIG. 4B is a plan view. FIG. 4C is a side view. As shown in FIGS. 4A to 4C, the first lens array 60 is an optical component having a plurality of rectangular lenses 62 as the small lenses arranged two-dimensionally. Each of the rectangular lenses 62 is a plano-convex lens. The vertical and horizontal sizes of the rectangular lens 62 are similar to those of the liquid crystal light valve 92, which is the illuminated area. Since it is assumed in the present example that the liquid crystal light valve 92 to be illuminated has an aspect ratio of 16:9, the ratio of the vertical size to the horizontal size of the rectangular lens 62 is also 9:16. That is, the rectangular shape is an oblong shape.

The horizontal (longer-side) direction x of the rectangular lens 62 is that shown in FIG. 1. The longer-side direction x is the same as the direction of the longer side of the liquid crystal light valve 92. The rectangular lens 62 is a "first small lens," which is one of the components of the embodiment.

Figure 5:
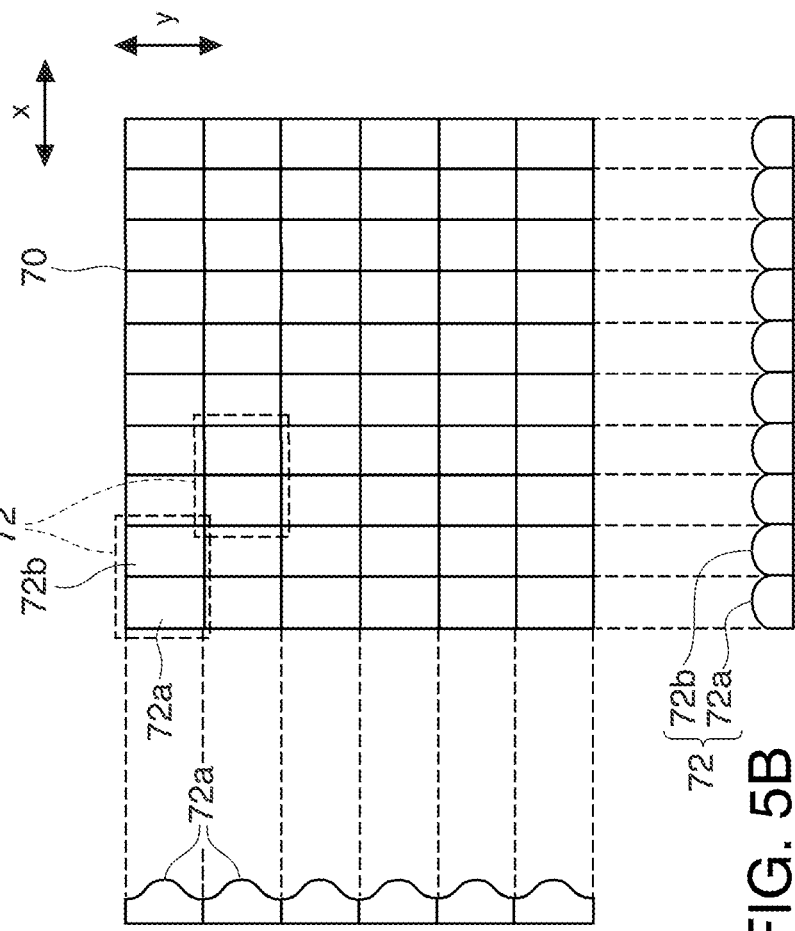
FIGS. 5A to 5C are descriptive diagrams illustrating a second lens array.

FIGS. 5A to 5C are descriptive diagrams showing the second lens array 70. FIG. 5A is a front view. FIG. 5B is a plan view. FIG. 5C is a side view. As shown in FIGS. 5A to 5C, the second lens array 70 is an optical component having a plurality of rectangular lenses 72 arranged two-dimensionally. The number of rectangular lenses 72 is the same as that of the rectangular lenses 62 arranged in the first lens array 60, and each of the rectangular lenses 72 has a one-to-one relationship with each of the rectangular lenses 62 arranged on the first lens array 60. In the present example, the vertical and horizontal sizes of each of the rectangular lens 72 are the same as those of each of the rectangular lenses 62 arranged in the first lens array 60. Each of the rectangular lenses 72 is a "second small lens," which is one of the components of the embodiment.

Each of the rectangular lenses 72 is formed of two lens elements 72a and 72b. The first and second lens elements 72a, 72b have the same shape and size, and the two lens elements 72a and 72b arranged in the horizontal direction x form the rectangular lens 72. The horizontal direction x used here is the same as the x direction shown in FIGS. 4A to 4C and FIG. 1. The direction in which the first and second lens elements 72a, 72b are disposed is the same as the direction of the longer side of the liquid crystal light valve 92.

Figure 6:
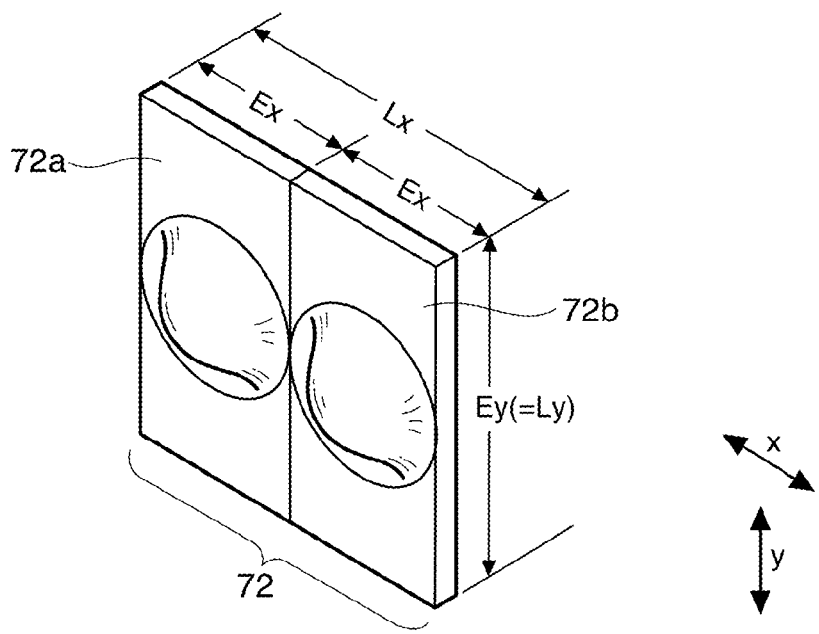
FIG. 6 is an enlarged descriptive diagram illustrating a rectangular lens.

FIG. 6 is an enlarged descriptive diagram showing one of the rectangular lenses 72. The lens elements 72a and 72b are plano-convex lenses and joined with each other in the horizontal direction x. The size Ex of each of the lens elements 72a and 72b in the horizontal direction x is one-half the size Lx of the rectangular lens 72 in the horizontal direction x, and the size Ey of each of the lens elements 72a and 72b in the vertical direction y (the direction perpendicular to the x direction) is the same as the size Ly of the rectangular lens 72 in the vertical direction y. As shown in FIG. 6, each of the lens elements 72a and 72b is a plano-convex lens.

Referring back to FIG. 1, the parallelized light flux from the collector lens 50 is divided into a plurality of segmental light fluxes by the rectangular lenses 62 arranged in the first lens array 60. The segmental light fluxes having exited from the rectangular lenses 62 are focused on the rectangular lenses 72 arranged in the second lens array 70. A large number of images of the illuminants 21a and 31a are formed on the second lens array 70. That is, a single rectangular lens 62 in the first lens array 60 corresponds to two lens elements 72a and 72b in the second lens array 70.

Figure 7:
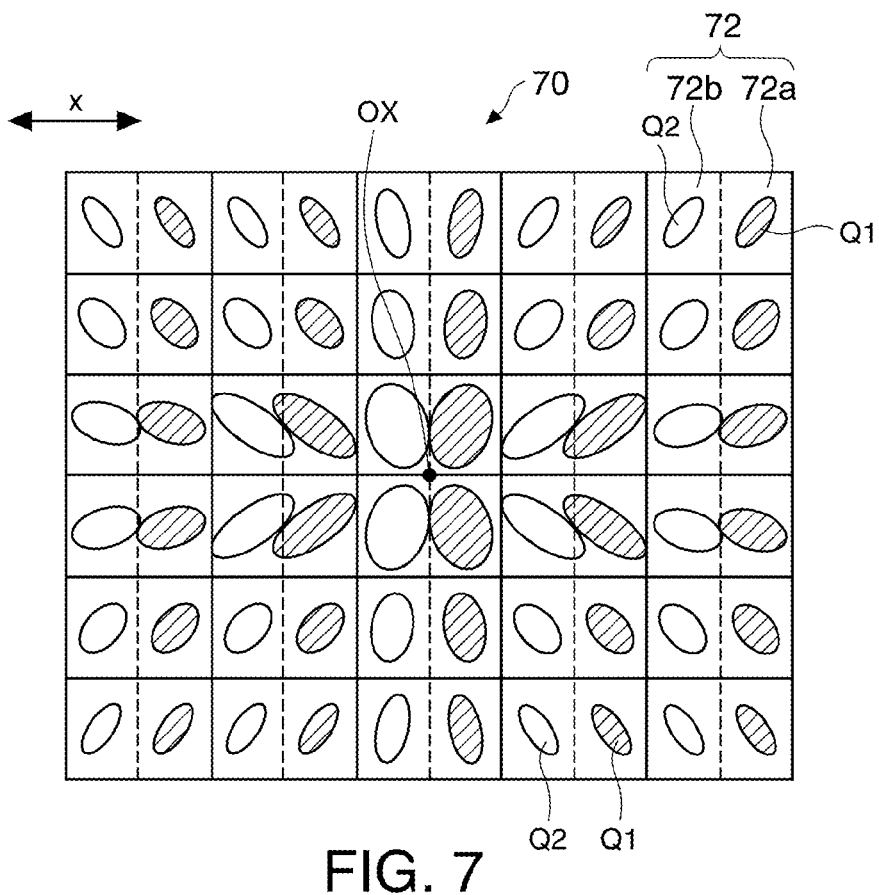
FIG. 7 is a descriptive diagram diagrammatically illustrating illuminant images when viewed from the light-exiting side of the second lens array.

FIG. 7 is a descriptive diagram diagrammatically showing the images of the illuminants when viewed from the light-exiting side of the second lens array 70. As shown in FIG. 7, two illuminant images Q1 and Q2 corresponding to the illuminants 21a and 31a are formed on each of the rectangular lenses 72 arranged in the second lens array 70. In FIG. 7, the illuminant image Q1 corresponding to the illuminant 21a is hatched and hence distinguished from the illuminant image Q2 that corresponds to the illuminant 31a but is not hatched. The illuminant image Q1 is shifted to the right in FIG. 7 in the horizontal direction x of the rectangular lens 72, that is, to the side where the first discharge lamp 20 is disposed when viewed from the reflection prism 40 (see FIG. 1), whereas the illuminant image Q2 is shifted to the left in FIG. 7 in the horizontal direction x of the rectangular lens 72, that is, to the side where the second discharge lamp 30 is disposed when viewed from the reflection prism 40 (see FIG. 1).

In other words, since the images 41a and 42a of the illuminants 21a and 31a formed on the reflection prism 40 are disposed side-by-side in the direction that is the same as the x direction described above as shown in FIG. 2, the illuminant images Q1 and Q2 are shifted from each other in the x direction as described above.

Since each of the rectangular lenses 72 in the second lens array 70 is divided into the first and second lens elements 72a, 72b in the horizontal direction x as described above, the illuminant image Q1 corresponding to the illuminant 21a is formed on the first lens element 72a, and the illuminant image Q2 corresponding to the illuminant 31a is formed on the second lens element 72b.

Since the density of the light flux incident on the first lens array 60 decreases with distance from the optical axis OX due to the effect of the collector lens 50, the sizes of the illuminant images Q1 and Q2 also decrease with distance from the optical axis OX.

The integrator formed of the thus configured first and second lens arrays 60, 70 divides the incident light flux into a large number of segmental light fluxes and enlarges them before they exit from the integrator. The segmental light fluxes having exited from the second lens array 70 are incident on the superimposing lens 80, which superimposes and focuses the segmental light fluxes on the liquid crystal light valve 92. As a result, the illumination system 10 can be used to uniformly illuminate the liquid crystal light valve 92, which is the illuminated area.

Further, each of the rectangular lenses 72 arranged in the second lens array 70 is formed of the two lens elements 72a and 72b. Therefore, when the light flux emitted from the second light source SL is slightly divided into two (see FIG. 2), the divided light fluxes can be transferred through the lens elements 72a and 72b. The segmental light fluxes having exited from the second lens array 70 can therefore be precisely superimposed and focused on the liquid crystal light valve 92. As a result, image blur will not occur on the liquid crystal light valve 92.

The illumination light flux having exited from the superimposing lens 80, that is, the illumination light flux having exited from the illumination system 10, is incident on the field lens 90. The field lens 90 causes the light that will illuminate the liquid crystal light valve 92 to be focused in the pupil plane of the projection lens 94. The projection lens 94 projects the optical image formed on the liquid crystal light valve 92 onto a screen SC.

The thus configured illumination system 10 provided in the projection-type display apparatus 1 of the present example can advantageously prevent image blur on the liquid crystal light valve 92, as described above. Further, the fact that preventing image blur eliminates the need to increase the amount of illumination light advantageously provides a high-brightness projection-type display apparatus at reduced electric power.

Moreover, in the present example, since the direction in which the first and second lens elements 72a, 72b, which form each of the rectangular lenses 72 arranged in the second lens array 70, are disposed is the same as not only the direction of the longer side of the liquid crystal light valve 92, which is the illuminated area, but also the direction in which the images 41a and 42a of the illuminants 21a and 31a, which are formed as the secondary light source SL, are disposed, the segmental light fluxes having exited from the second lens array 70 can be precisely superimposed and focused on the liquid crystal light valve 92 even when the two illuminants 21a and 31a are used.

Further, since the projection-type display apparatus 1 of the present example includes the two discharge lamps 20 and 30, the brightness can be increased.

Variations

The present disclosure is not limited to the example described above and variations thereof, but can be implemented in a variety of aspects to the extent that they do not depart from the spirit of the disclosure. For example, the following variations are possible.

First Variation

In the example described above, every rectangular lens 72 arranged in the second lens array 70 includes the first and second lens elements 72a, 72b. Instead, only part of the rectangular lenses may include a plurality of lens elements.

Figure 8:
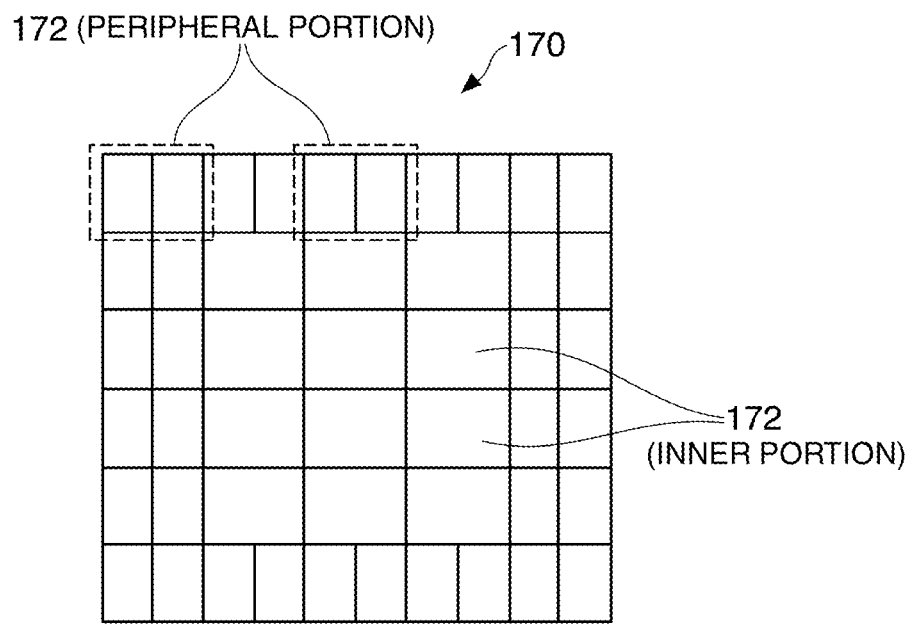
FIG. 8 is a front view of a second lens array provided in a first variation.

FIG. 8 is a front view of a second lens array 170 provided in the first variation. As shown in FIG. 8, the peripheral portion of a plurality of rectangular lenses 172 arranged in the second lens array 170, that is, each of the rectangular lenses 172 located in the first and sixth rows and the first and fifth columns in the illustrated example, includes first and second lens elements 172a, 172b, whereas each of the other rectangular lenses 172 arranged in the third and fourth rows in the inner portion is formed of a single lens. As shown in FIG. 7, the sizes of the illuminant images Q1 and Q2 formed on the second lens array 70 decrease and the deviations of the positions of the illuminant images Q1 and Q2 increase with distance from the optical axis OX. In the first variation described above, however, the segmental light fluxes can be sufficiently superimposed on the liquid crystal light valve 92 because each of the rectangular lenses 172 in the peripheral portion, which is the farthest portion from the optical axis OX, includes the first and second lens elements 172a, 172b.

Second Variation

Figure 9:
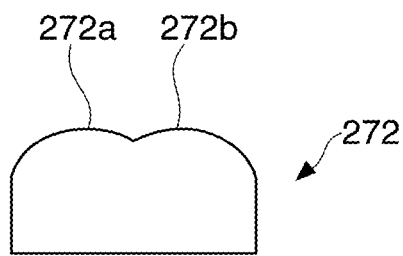
FIG. 9 is a plan view of a second small lens provided in a second variation.

In the example described above, the convex portions of the plurality of lens elements that form each of the second small lenses arranged in the second lens array are substantially spaced apart from each other. Instead, the convex portions may be close to each other. FIG. 9 is a plan view of one of the second small lenses provided in the second variation. As shown in FIG. 9, the second small lens (rectangular lens) 272 includes first and second lens elements 272a, 272b. The curvature of the spherical surface of the first and second lens elements 272a, 272b is the same as that of the lens elements 72a and 72b in the example described above, but the convex portions of the first and second lens elements 272a, 272b are close to each other and overlap with each other. This configuration also allows the segmental light fluxes to be sufficiently superimposed on the liquid crystal light valve, as in the case of the example described above.

Figure 10:
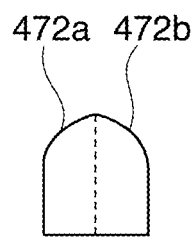
FIG. 10 is a plan view showing another example of the second small lens provided in the second variation.

FIG. 10 is a plan view showing another example of one of the second small lenses provided in the second variation. In the second variation shown in FIG. 9, the apexes of the first and second lens elements 272a, 272b still remain. In contrast, in the illustration of FIG. 10, greater parts of the convex portions of the lens elements overlap with each other than in the second variation shown in FIG. 9, and first and second lens elements 472a, 472b forma single apex. This configuration also allows the segmental light fluxes to be sufficiently superimposed on the liquid crystal light valve, as in the case of the example described above.

The plurality of lens elements that form each of the second small lenses do not necessarily have the shapes in the example described above and the variations thereof, but may be convex lenses having other shapes. Further, the plurality of lens elements that form each of the second small lenses do not necessarily have the same shape and size, but may have different shapes and sizes.

Third Variation

While the number of lens elements that form each of the second small lenses arranged in the second lens array 70 is two in the example described above, the number is not necessarily two but may be three, four, or other plural numbers. The number of lens elements that form each of the second small lenses may be the same as the number of illuminants provided in the light source. That is, a single rectangular lens 62 in the first lens array 60 corresponds to the plurality of lens elements 72a and 72b in the second lens array.

Figure 11:
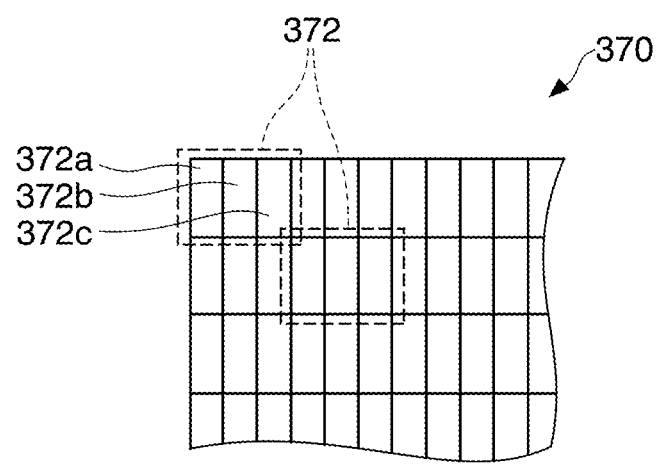
FIG. 11 is a front view of a second lens array provided in a third variation.

FIG. 11 is a front view of a second lens array 370 provided in the third variation. As shown in FIG. 11, each of a plurality of rectangular lenses 372 arranged in the second lens array 370 includes first, second, and third lens elements 372a, 372b, 372c. The direction in which the first to third lens elements 372a to 372c are disposed is the same as not only the direction of the longer side of the illuminated area but also the direction in which the images of three illuminants formed as the secondary light source SL are disposed. This configuration can further increase the brightness of a projected image and can prevent image blur at the same time.

Fourth Variation

While the liquid crystal light valve 92 as the illuminated area is an oblong shape in the example described above, the shape of the liquid crystal light valve 92 is not limited to oblong but may be a square shape. Further, the shape is not limited to oblong or square, but can be circular, elliptical, or any other suitable shape.

Fifth Variation

While the projection-type display apparatus 1 of the example described above is a dual-lamp type including the first and second discharge lamps 20, 30, the projection-type display apparatus 1 is not necessarily a dual-lamp type but may be, for example, a single-lamp type. A single-lamp configuration will be described below in detail with reference to the drawings.

Figure 12:
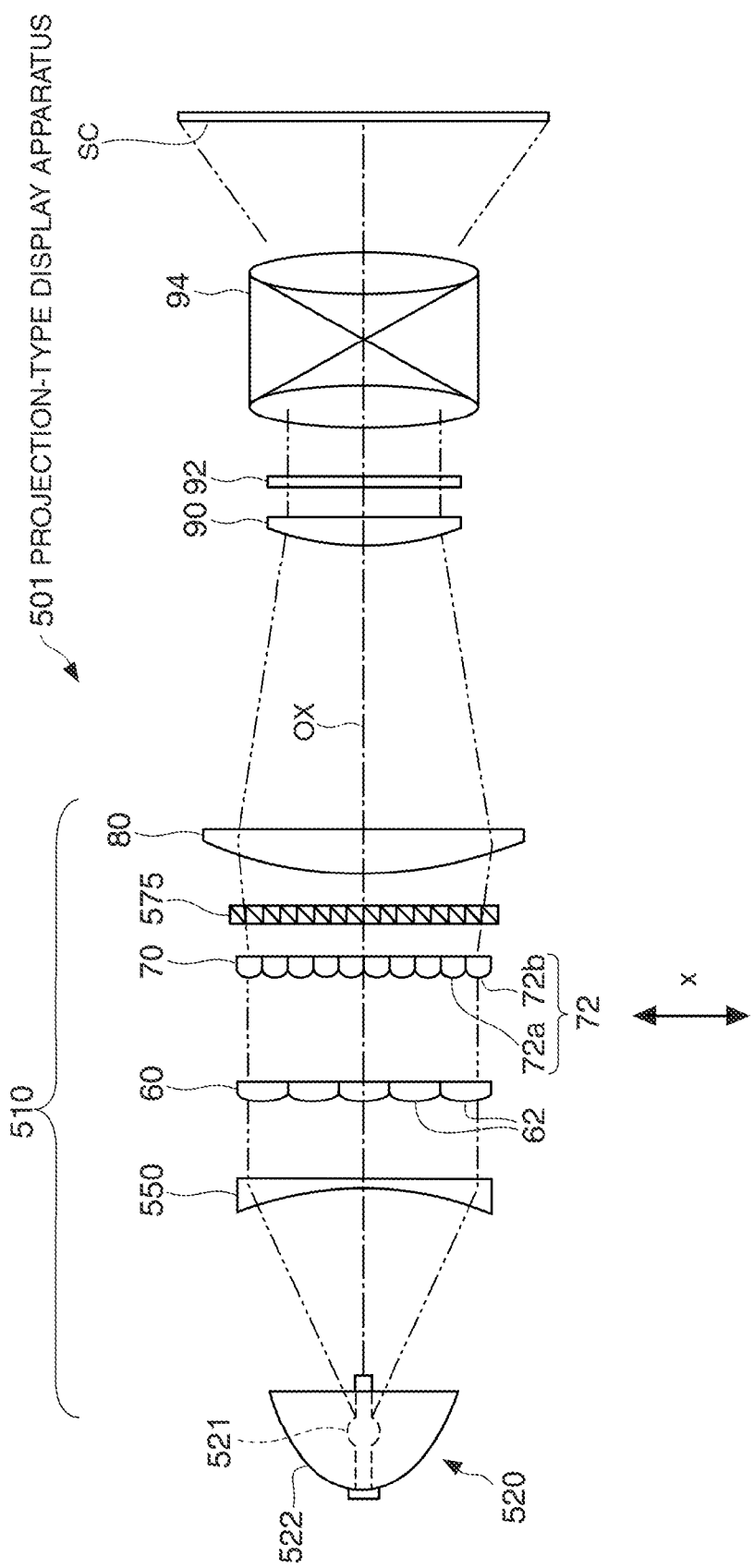
FIG. 12 is a descriptive diagram schematically showing an optical system of a projection-type display apparatus as a fifth variation.

FIG. 12 is a descriptive diagram schematically showing an optical system of a projection-type display apparatus 501 as the fifth variation. FIG. 12 is a top view. As shown in FIG. 12, the projection-type display apparatus 501 includes an illumination system 510, a field lens 90, a liquid crystal light valve 92, and a projection lens 94. The field lens 90, the liquid crystal light valve 92, and the projection lens 94 are configured in the same manner as in the example described above and have the same reference characters as those in the example described above.

The illumination system 510 includes a discharge lamp 520, a parallelizing lens 550, first and second lens arrays 60, 70 that form an integrator, a PBS (polarization beam splitter) 575, and a superimposing lens 80. The first and second lens arrays 60, 70 and the superimposing lens 80 are configured in the same manner as in the example described above and have the same reference characters as those in the example described above. The PBS 575 is an element that converts randomly polarized light into linearly polarized light. The PSB 575 is omitted in the example described above, but explicitly included in the present example.

The discharge lamp 520 can be a metal-halide lamp, an ultrahigh-pressure mercury lamp, a xenon lamp, or any other suitable lamp, and includes an arc tube 521 and a reflector 522, as in the case of the example described above. The light from the discharge lamp 520 passes through the parallelizing lens 550, where the light is converted into parallelized light flux. The parallelized light flux is incident on the first lens array 60 having a plurality of small lenses arranged therein.

The first and second lens arrays 60, 70 and the superimposing lens 80 are configured in the same manner as in the example described above and provide the same effects as those in the example described above.

The thus configured illumination system 510 provided in the projection-type display apparatus 501 of the fifth variation can advantageously prevent image blur on the liquid crystal light valve 92, as in the case of the example described above. The reason that the illumination system 510 can prevent image blur is as follows.

Even when the projection-type display apparatus is a single-lamp type as shown in the fifth variation, an integrator of related art may disadvantageously cause each of the segmental light fluxes having exited from the first lens array to slightly deviate from the optical axis of the corresponding one of the small lenses arranged in the second lens array. In contrast, in the fifth variation, since each of the rectangular lenses 72 in the second lens array 70 is divided into the first and second lens elements 72a, 72b, either of the first lens element 72a or the second lens element 72b can receive the deviated segmental light flux having exited from the first lens array. As a result, no image blur will occur.

Sixth Variation

While the projection-type display apparatus of the example described above has been described with reference to the case where a transmissive liquid crystal light valve is used as the illuminated area, the illuminated area is not limited thereto but may be a reflective liquid crystal panel or a mirror-type device in which a plurality of tiny mirrors modulate light. The projection-type display apparatus may be either a front two-piece type or a rear one-piece type. Further, the projection-type display apparatus may include a known color separation system and light combining system. Moreover, the projection-type display apparatus may be other apparatus, such as a monitor apparatus including any of the illumination systems shown in the example described above and the variations thereof.

Although certain embodiments and variations have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways.

What is claimed is:

1. An optical integrator comprising:
a first lens array having a plurality of first small lenses arranged therein, the first small lenses dividing an incident first illumination light flux into a plurality of first segmental light fluxes and dividing an incident second illumination light flux into a plurality of second segmental light fluxes, each of the incident first illumination light flux and the incident second illumination light flux being directed toward the first lens array in a substantially parallelized light direction; and
a second lens array having a plurality of second small lenses arranged therein, the second small lenses having a one-to-one correspondence with the first small lenses, each of the first small lenses and each of the second small lenses having substantially the same length and width in arrangement directions of the first small lenses and of the second small lenses, each of the second small lenses receiving a first segmental light flux at a first location from a corresponding one of the first lenses and a second segmental light flux at a second location from a corresponding one of the first lenses, the first location and the second location being disposed adjacent to each other in a first direction that is the same as an arrangement direction of the second small lenses, wherein:
each of the first small lenses of the first lens array has only a single lens element,
a first plurality of the second small lenses of the second lens array each include a first lens element and a second lens element disposed adjacent to each other in the first direction, the first lens element receiving the corresponding first segmental light flux and the second lens element receiving the corresponding second segmental light flux,
a second plurality of the second small lenses of the second lens array each include only a single lens element,
each of the plurality of first small lenses and each of the plurality of second small lenses are plano-convex lenses having convex portions facing in a direction opposite the substantially parallelized light direction, and
the number of first small lenses included in the first lens array is equal to the number of second small lenses included in the second lens array.

2. An illumination system comprising:
the optical integrator according to claim 1,
wherein:
the incident first illumination light flux is emitted from a first light source and the incident second illumination light flux is emitted from a second light source, and
the first light source and the second light source each include an illuminant, and the number of the lens elements included in at least some of the second small lenses is the same as the number of the illuminants, and
the illumination system further comprises:
a plurality of concave mirrors, the number of concave mirrors being the same as the number of the illuminants, each of the concave mirrors being paired with one of the illuminants for collecting light fluxes emitted therefrom,
a light reflector on which the light fluxes collected by the plurality of concave mirrors are incident, the light reflector reflecting the light fluxes in predetermined directions, and
a collector lens on which the light fluxes reflected off the light reflector are incident, the collector lens converting and outputting the incident light flux into substantially parallelized light flux.

3. The illumination system according to claim 2, wherein a direction in which the images of the plurality of illuminants are formed on the light reflector coincides with a direction in which the plurality of lens elements in the second small lens are disposed.

4. The illumination system according to claim 2, wherein the collector lens is an aspheric biconvex lens.

5. A projection-type display apparatus comprising:
an illumination system including the optical integrator according to claim 1;
a light valve configured to receive illumination from the illumination system and form an optical image in accordance with an image signal; and
a projection unit configured to project the optical image from the light valve.

6. The projection-type display apparatus according to claim 5, wherein the ratio of the length to the width of each of the first small lenses and of each of the second small lenses is substantially the same as the aspect ratio of the light valve.

7. The optical integrator according to claim 1, wherein the total number of first small lenses included in the first lens array is equal to the total number of second small lenses included in the second lens array.

8. An illumination system configured to illuminate an illuminated area, the illumination system comprising:
a first light source that emits a first illumination light flux and a second light source that emits a second illumination light flux;
a first lens array having a plurality of first small lenses arranged therein, each of the first illumination light flux and the second illumination light flux being directed toward the first lens array in a substantially parallelized light direction, the first small lenses dividing the first illumination light flux into a plurality of first segmental light fluxes and dividing the second illumination light flux into a plurality of second segmental light fluxes;
a second lens array having a plurality of second small lenses arranged therein, the second small lenses having a one-to-one correspondence with the first small lenses, each of the first small lenses and each of the second small lenses having substantially the same length and width in arrangement directions of the first small lenses and of the second small lenses, each of the second small lenses receiving a first segmental light flux at a first location from a corresponding one of the first lenses and a second segmental light flux at a second location from a corresponding one of the first lenses, the first location and the second location being disposed adjacent to each other in a first direction that is the same as an arrangement direction of the second small lenses; and
a superimposing lens that superimposes on the illuminated area the segmental light fluxes exiting from the plurality of second small lenses,
wherein:
each of the first small lenses of the first lens array has only a single lens element, a first plurality of the second small lenses of the second lens array each include a first lens element and a second lens element disposed adjacent to each other in the first direction, the first lens element receiving the corresponding first segmental light flux and the second lens element receiving the corresponding second segmental light flux, each of the first lens element and the second lens element having a spherical surface and forming a single apex in the first direction, a second plurality of the second small lenses of the second lens array each include only a single lens element, each of the plurality of first small lenses and each of the plurality of second small lenses are plano-convex lenses having convex portions facing in a direction opposite the substantially parallelized light direction, and the number of first small lenses included in the first lens array is equal to the number of second small lenses included in the second lens array.

9. The illumination system according to claim 8, wherein:
the first light source and the second light source each include an illuminant, and the number of the lens elements included in at least some of the second small lenses is the same as the number of the illuminants, and the illumination system further comprises:
a plurality of concave mirrors, the number of concave mirrors being the same as the number of the illuminants, each of the concave mirrors being paired with one of the illuminants for collecting light fluxes emitted therefrom, a light reflector on which the light fluxes collected by the plurality of concave mirrors are incident, the light reflector reflecting the light fluxes in predetermined directions, and a collector lens on which the light fluxes reflected off the light reflector are incident, the collector lens converting and outputting the incident light flux into substantially parallelized light flux.

10. The illumination system according to claim 9, wherein a direction in which the images of the plurality of illuminants are formed on the light reflector coincides with a direction in which the plurality of lens elements in the second small lens are disposed.

11. The illumination system according to claim 9, wherein the collector lens is an aspheric biconvex lens.

12. A projection-type display apparatus comprising:
the illumination system according to claim 8;
a light valve configured to receive illumination from the illumination system and form an optical image in accordance with an image signal; and
a projection unit configured to project the optical image from the light valve.

13. The projection-type display apparatus according to claim 12, wherein the ratio of the length to the width of each of the first small lenses and of each of the second small lenses is substantially the same as the aspect ratio of the light valve.

14. An illumination system configured to illuminate an illuminated area, the illumination system comprising:
a first light source that emits a first illumination light flux and a second light source that emits a second illumination light flux;
a first lens array having a plurality of first small lenses arranged therein, the first small lenses dividing the first illumination light flux into a plurality of first segmental light fluxes and dividing the second illumination light flux into a plurality of second segmental light fluxes;

a second lens array having a plurality of second small lenses arranged therein, the second small lenses having a one-to-one correspondence with the first small lenses and receiving the first segmental light flux at a first location and a corresponding second segmental light flux at a second location, the first location and the second location being disposed adjacent to each other in a first direction; and a superimposing lens that superimposes on the illuminated area the segmental light fluxes exiting from the plurality of second small lenses, wherein:
each of the first small lenses of the first lens array has only a single lens element, a first plurality of the second small lenses of the second lens array each include a first lens element and a second lens element disposed adjacent to each other in the first direction, the first lens element receiving the corresponding first segmental light flux and the second lens element receiving the corresponding second segmental light flux, each of the first lens element and the second lens element having a spherical surface and forming a single apex in the first direction, a second plurality of the second small lenses of the second lens array each include only a single lens element, and the number of first small lenses included in the first lens array is equal to the number of second small lenses included in the second lens array.

15. The illumination system according to claim 14, wherein:
the first light source and the second light source each include an illuminant, and the number of the lens elements included in at least some of the second small lenses is the same as the number of the illuminants, and the illumination system further comprises:
a plurality of concave mirrors, the number of concave mirrors being the same as the number of the illuminants, each of the concave mirrors being paired with one of the illuminants for collecting light fluxes emitted therefrom, a light reflector on which the light fluxes collected by the plurality of concave mirrors are incident, the light reflector reflecting the light fluxes in predetermined directions, and a collector lens on which the light fluxes reflected off the light reflector are incident, the collector lens converting and outputting the incident light flux into substantially parallelized light flux.

16. The illumination system according to claim 15, wherein a direction in which the images of the plurality of illuminants are formed on the light reflector coincides with a direction in which the plurality of lens elements in the second small lens are disposed.

17. The illumination system according to claim 15, wherein the collector lens is an aspheric biconvex lens.

18. A projection-type display apparatus comprising:
the illumination system according to claim 14;
a light valve configured to receive illumination from the illumination system and form an optical image in accordance with an image signal; and
a projection unit configured to project the optical image from the light valve.

19. The projection-type display apparatus according to claim 18, wherein the ratio of the length to the width of each of the first small lenses and of each of the second small lenses is substantially the same as the aspect ratio of the light valve.

\* \* \* \* \*